Dec. 5, 1967

G. STEIN 3,356,261

HYDRAULIC CONTROL FOR ASPHALT SPREADER

Filed April 22, 1965

INVENTOR
GARY STEIN
BY John J Byrne
ATTORNEY

United States Patent Office 3,356,261
Patented Dec. 5, 1967

3,356,261
HYDRAULIC CONTROL FOR ASPHALT SPREADER
Gary Stein, New Berlin, Wis., assignor to Applied Power Industries, Inc., Milwaukee, Wis., a corporation of Wisconsin
Filed Apr. 22, 1965, Ser. No. 450,078
6 Claims. (Cl. 222—63)

This invention relates to an improvement in a vehicle-mounted distributor which carries a material which is to be spread along a road surface and more particularly relates to a vehicle in which the rate of distribution is selected and thereafter independent of vehicle speed.

A principal objective of this invention is to provide a means to detect vehicle speed by developing a pressure corresponding to the intelligence derived from a wheel engaged with the ground and with further means for relating this intelligence to a variable volume hydraulic pump.

Another important objective of this invention is to provide a vehicle having the capability of distributing asphalt or other compositions evenly over a surface although vehicle speed is varied.

Another important objective of this invention is to provide an asphalt distributor which does not require the use of an auxiliary power plant. Prior to this invention, it was conventional to carry auxiliary engines for operating asphalt distributors. Auxiliary engines were necessary primarily because distribution could not depend on the variations in throttle setting of the prime mover engine. In the instant invention, however, a hydraulic pump is provided for driving the asphalt distributor, which pump is driven directly from the prime mover engine. The pump is of a variable type, the output of which can be adjusted in response to a detected true speed of the vehicle regardless of prime mover engine speed.

A very important objective of this invention is to provide means for developing a first pressure dependent on a rotating intelligence gathered by a wheel and a second pressure corresponding to the rate at which the asphalt distributor is operated together with means for relating the two at the mechanism for varying pump output.

Figure 1:
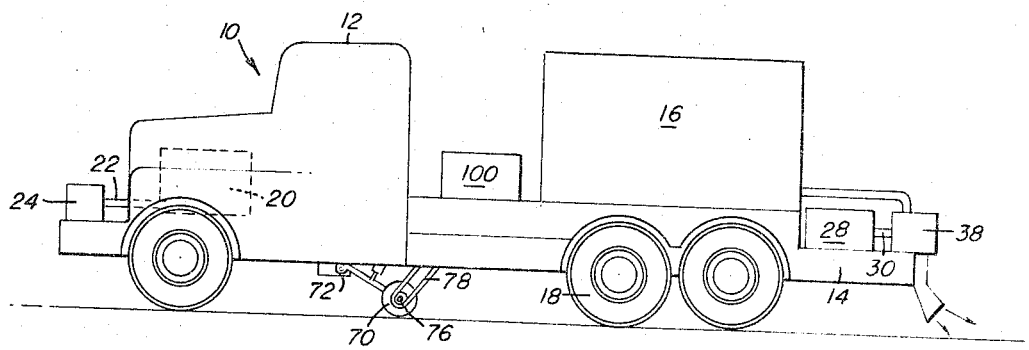
Figure 2:
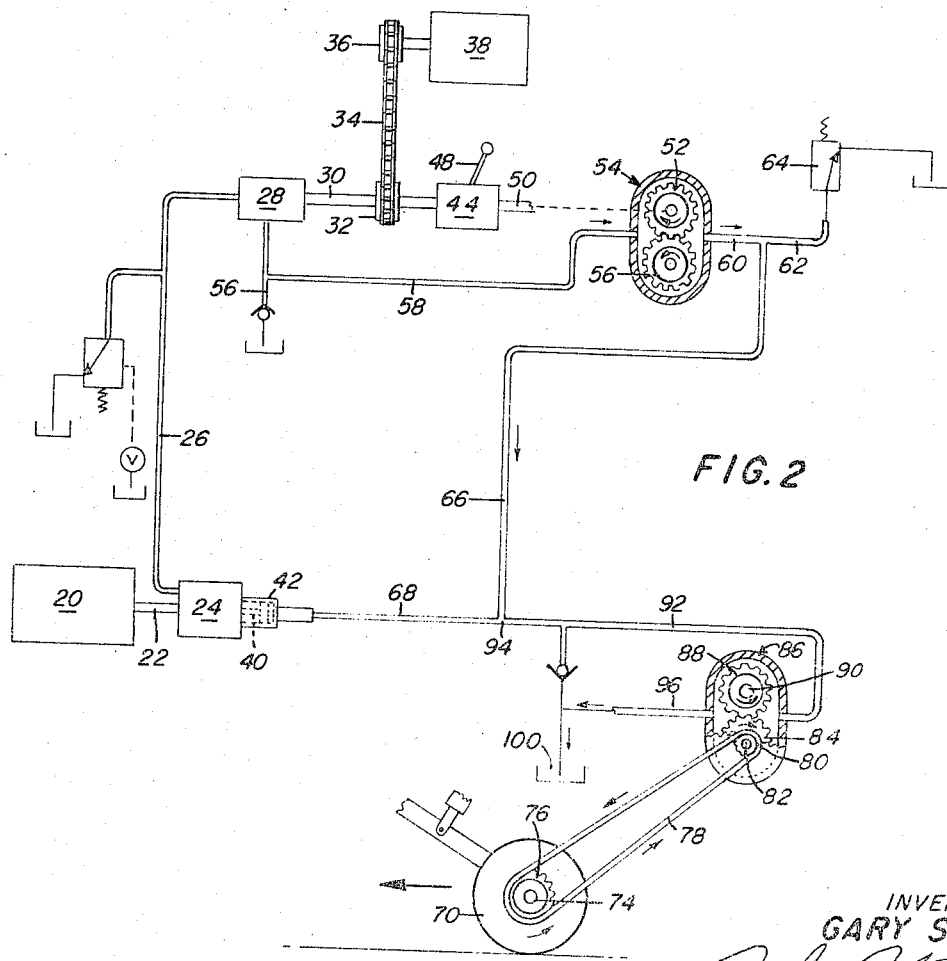

The specific nature of the invention, as well as other objects, aspects, uses and advantages thereof, will clearly appear from the following description and from the accompanying drawings, in which:

FIGURE 1 is a side elevation view of a vehicle showing the general position of the principal components of this invention; and FIGURE 2 is a schematic-diagrammatic view of the mechanical and hydraulic components of which this invention is comprised.

Referring now more particularly to the drawings wherein like elements are indicated by like numerals, the numeral 10 indicates the vehicle with which the present invention is utilized. The vehicle 10 includes a cab or operator cabin 12 and a loading frame 14 to which a tank 16 is mounted. The vehicle further includes conventional ground-engaging wheels 18 and a prime mover engine 20 having, in addition to its conventional transmission shaft, a front output shaft 22.

Mounted to the front of the vehicle and driven by shaft 22 is a hydraulic pump 24 having a fluid output 26. The output 26 leads to a hydraulic motor 28 having an output shaft 30. Affixed to a point intermediate the length of the output shaft 30 is a sprocket 32 about which a drive chain 34 is meshed. The other end of drive chain 34 is meshed with a second sprocket 36 which provides the rotational input to the asphalt distributor assembly 38.

The pump is of a type described in the United States patent issued to Philip Stewart, No. 2,997,956. The variable output volume is accomplished by stroking the piston 40 of the variable volume control 42. For purposes of this invention it can be considered that an inward stroking of piston 40 will decrease pump output and an outward stroke of piston 40 causes an increase in pump output.

The outer end of shaft 30 provides the input to a variable reduction box 44. The box is equipped with an adjusting handle 48. The output shaft 50 from the box 44 supplies a rotational input to a positive displacement gear-type pump 54. The pump, therefore, has a direct ratio to the input to the asphalt distributor. The gear pump 54, in effect monitors the speed of the input to the distributor.

The shaft 50 is affixed to a drive gear 52 of the positive displacement pump 54. The idler gear is indicated by the numeral 56. The fluid input conduit 58 leading to pump 54 is communicated to the reservoir conduit of motor 28. The output from pump 54 is through a conduit 60 which has a branch 62 leading to a pressure relief valve 64. A second branch 66 is in communication with unit 42 via the fluid conduit 68.

Mounted to the underneath side of the loading frame 14, conveniently below the truck runningboard, is a fifth wheel 70 swingable into engagement with the ground. The wheel is supported via a bracket 72 on a rotating axle 74. Ground engagement of wheel 70 during spreading is maintained by springs, weights, hydraulic cylinders or other conventional supporting apparatus. It is of course desirable to swing the wheel out of engagement with the ground when the vehicle is not used as a distributor. Also mounted on axle 74 is a sprocket 76 about which a chain 78 is meshed. The other loop of chain 78 meshes with a sprocket 80 which is fixedly secured to a stub shaft 82 which is journaled through the housing of a positive displacement pump 86. The interior end of the stub shaft is securely fixed to a driven gear 84. The idler gear of pump 86 is indicated by the numeral 88 and is rotatably supported within the pump housing on shaft 90. The input to pump 86 is through conduit 92 which conduit is in communication with conduits 66 and 68 at juncture 94. The fluid output from pump 86 is through line 96 to tank or reservoir 100.

The operation of the assembly can best be understood with reference to FIGURE 2. The engine 20 drives pump 24 while propelling the vehicle 10. The pump hydraulically drives the motor 28 which, in turn, has an output shaft 30 in driving arrangement with the asphalt distributor mechanism 38. The shaft 30 is mechanically connected to the positive displacement gear-type pump 54 which is driven through a variable reduction box 44. The fluid intake to the positive displacement gear pump 54 consists of a portion of the exhaust fluid from motor 28. The fluid output of pump 54 is communicated to a variable volume control 42 via fluid conduits 66 and 68.

The speed of vehicle 10 is sensed by a fifth wheel 70 having a mechanical output driving gear 84 of the positive displacement pump 86. The input to pump 86 is communicated to conduits 66 and 68 via the conduit 92.

For purposes of illustration, it can be assumed that the handle of the variable reduction box 48 is so adjusted that the asphalt distributor will distribute a particular amount of bituminous material over a particular area while the vehicle traverses a particular area. In other words, the position of handle 48 determines the degree or thickness of spread the apparatus should dispense on a particular job. When vehicle speed increases, the pump 86 is more active causing a pressure drop at 94. The drop in pressure is reflected in the variable response unit 42 causing a greater output from pump 24 which increases the output from motor 28. This causes the distributor 38 to work at an increased rate. The pumping rate of pump 54 will likewise increase providing additional fluid to pump 86. The position of piston 40 of unit 42 is thus adjusted for an increase in vehicle speed.

Conversely, in the event of a decrease in speed, there is a pressure buildup at point 94 because pump 86 will be unable to accept the output from pump 54. The increased pressure is reflected in unit 42 causing piston 40 to move inwardly to lessen the output from pump 24 with a consequent slowing of the distributing operation until a balance is again reached at point 94.

Described above is an asphalt distributor utilizing the prime mover engine to operate the distributing mechanism. The distributing mechanism is controlled in a manner to dispense its material for a selected coverage with varying vehicle speed but being unaffected by the engine speed of the prime mover.

It will be apparent that the embodiment shown is only exemplary and that various modifications can be made in construction and arrangement within the scope of the invention as defined in the appended claims.

I claim:

1. A device for controlling the rate of distribution of a fluid material from a moving vehicle comprising an engine propelling said vehicle, a hydraulic pump driven by said engine, first means to vary the output of said pump, a hydraulic motor driven by said pump, an output shaft driven by said motor, a material distributing mechanism driven by said output shaft at a rate corresponding to the speed at which said pump drives said motor, a variable fluid delivery means also driven by said output shaft, second means detecting the speed at which said vehicle is traveling and third means responsive to said second means for adjusting said first means.

2. A device for controlling the rate of distribution of a fluid material from a moving vehicle comprising an engine propelling said vehicle, a hydraulic pump driven by said engine, first means to vary the output of said pump, a hydraulic motor driven by said pump, an output shaft driven by said motor, a material distributing mechanism driven by said output shaft at a rate corresponding to the speed at which said pump drives said motor, gear reduction means receiving the output of said shaft, second means driven by said gear reduction means, third means detecting the speed at which said vehicle is traveling and fourth means responsive to said second and third means for adjusting said first means.

3. A device for controlling the rate of distribution of a fluid material from a moving vehicle comprising an engine propelling said vehicle, a hydraulic pump driven by said engine, first means to vary the output of said pump, a hydraulic motor driven by said pump, an output shaft driven by said motor, a material distributing mechanism driven by said output shaft at a rate corresponding to the speed at which said pump drives said motor, gear reduction means receiving the output of said shaft, second means driven by said gear reduction means, a ground engaging wheel depending from said vehicle determining the speed at which said vehicle is traveling and third means responsive to the determined speed and said second means for adjusting said first means.

4. A device for controlling the rate of distribution of a fluid material from a moving vehicle comprising an engine propelling said vehicle, a hydraulic pump driven by said engine, first means to vary the output of said pump, a hydraulic motor driven by said pump, and output shaft driven by said motor, a material distributing mechanism driven by said output shaft at a rate corresponding to the speed at which said pump drives said motor, a variable fluid delivery means also driven by said output shaft, a ground engaging wheel depending from said vehicle determining the speed at which said vehicle is traveling and second means responsive to the determined speed for adjusting said first means.

5. A hydraulic system comprising a variable delivery pump, a fluid motor driven by said pump, a rotating shaft driven by said motor, a first positive displacement pump driven by said shaft and having a fluid output, a rotary sensing device driving a second shaft at a rotation rate corresponding to the condition sensed, a second positive displacement pump driven by said second shaft having a fluid input in communication with said output, a stroking piston, means to vary the delivery of said variable pump in accordance with the position of said stroking piston, a cylinder about said piston defining a pressure chamber therewith, means communicating said input and output with said chamber to thereby position said piston in accordance with the pressure drop in said fluid input decreasing the pressure in the rate at which said second shaft is driven causes a pressure drop in said fluid input decreasing the pressure in said chamber causing said piston to stroke to a position increasing the delivery of said pump causing the pressure in said output to rise the amount necessary to equalize said pressure drop.

6. A hydraulic system for maintaining the rate at which a fluid material is distributed upon the ground in response to the speed of a moving vehicle, comprising a variable delivery pump powered by the engine of said vehicle, a fluid motor driven by said pump, a rotating shaft driven by said motor, a distributor driven by said shaft, a first positive displacement pump also driven by said shaft having a fluid output, a ground engaging wheel driving a second shaft at a rotation rate corresponding to the speed of said vehicle, a second positive displacement pump driven by said second shaft having a fluid input in communication with said output, a stroking piston, means to vary the delivery of said variable pump in accordance with the position of said stroking piston, a cylinder about said piston defining a pressure chamber therewith, means communicating said input and output with said chamber to position said piston in accordance with the pressures of said input and output, whereby an increase in the rate at which said second shaft is driven causes a pressure drop in said fluid input decreasing the pressure in said chamber causing said piston to stroke to a position increasing the delivery of said pump causing the pressure in said output to rise the amount necessary to equalize said pressure drop.

References Cited

UNITED STATES PATENTS

| 2,159,319 | 5/1939 | Cartwright | 239—73 |
| 3,003,262 | 10/1961 | De Biasi. | |
| 3,019,025 | 1/1962 | Young. | |
| 3,233,832 | 2/1966 | Hallberg | 239—155 |

FOREIGN PATENTS 236,223   5/1960   Australia.

ROBERT B. REEVES, *Primary Examiner.*

F. R. HANDREN, *Assistant Examiner.*